(12) United States Patent
Oh

(10) Patent No.: US 8,653,407 B2
(45) Date of Patent: Feb. 18, 2014

(54) METHOD AND APPARATUS FOR THE QUALITY INSPECTION OF LASER WELDING

(75) Inventor: Kwang Min Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 344 days.

(21) Appl. No.: 13/094,257

(22) Filed: Apr. 26, 2011

(65) Prior Publication Data
US 2012/0125899 A1 May 24, 2012

(30) Foreign Application Priority Data

Nov. 18, 2010 (KR) ........................ 10-2010-0114723

(51) Int. Cl.
*B23K 26/20* (2006.01)
*B23K 26/03* (2006.01)

(52) U.S. Cl.
USPC ............. 219/121.63; 219/121.64; 219/121.83

(58) Field of Classification Search
USPC ............. 219/121.61, 121.62, 121.63, 121.64, 219/121.83; 374/127; 700/166
See application file for complete search history.

(56) References Cited

U.S. PATENT DOCUMENTS

| | | | |
|---|---|---|---|
| 5,155,329 A * | 10/1992 | Terada et al. | 219/121.83 |
| 6,134,253 A | 10/2000 | Munks et al. | |
| 6,357,910 B1 * | 3/2002 | Chen et al. | 374/127 |
| 6,399,915 B1 * | 6/2002 | Mori et al. | 219/121.83 |
| 6,738,724 B2 * | 5/2004 | McIntosh | 374/127 |
| 6,937,329 B2 * | 8/2005 | Esmiller | 219/121.63 |
| 2004/0026389 A1 * | 2/2004 | Kessler et al. | 219/121.83 |
| 2005/0011867 A1 * | 1/2005 | Okuda et al. | 219/121.63 |
| 2006/0279731 A1 * | 12/2006 | Beyer et al. | 356/318 |
| 2007/0024864 A1 * | 2/2007 | Tachikawa et al. | 356/498 |

FOREIGN PATENT DOCUMENTS

| | | | |
|---|---|---|---|
| EP | 1371443 A1 | | 12/2003 |
| JP | 106051 A | * | 1/1998 |
| JP | 11-114683 A | | 4/1999 |
| JP | 2000-042769 A | * | 2/2000 |
| JP | 2001-191186 A | * | 7/2001 |
| JP | 2001-219287 A | * | 8/2001 |
| JP | 2002-126885 A | | 5/2002 |
| JP | 2010-167433 A | | 8/2010 |

(Continued)

OTHER PUBLICATIONS

Machine translation of Japan Patent Document No. 2000-042,769, Jun. 2013.*

(Continued)

*Primary Examiner* — Geoffrey S Evans
(74) *Attorney, Agent, or Firm* — Edwards Wildman Palmer LLP; Peter F. Corless

(57) ABSTRACT

The present invention relates to a method and apparatus for inspecting the quality of laser welding by monitoring the size of a metal molten pool (i.e., weld metal) during a laser welding process. The present invention provides a method and apparatus for inspecting the quality of laser welding, in which a new type laser welding quality inspection system is implemented in which one sensor signal and one filtered electrical signal of the plasma light can be used to perform a correct welding quality inspection through the development of a filtering method of an electrical signal of the plasma light, thereby facilitating a laser welding quality management and making possible its example application to a vehicle body laser welding process.

14 Claims, 17 Drawing Sheets

(56) References Cited

FOREIGN PATENT DOCUMENTS

| KR | 10-1999-0037240 | | 5/1999 |
| KR | 10-0558773 | | 9/2005 |
| KR | 10-0922159 | | 4/2009 |
| KR | 10-0922160 | | 4/2009 |
| WO | WO-93/03881 | A1 * | 3/1993 |
| WO | WO-2005/051586 | A1 * | 6/2005 |

OTHER PUBLICATIONS

Machine translation of Japan Patent Document No. 2001-191,986, Jun. 2013.*

Machine translation of Japan Patent Document No, 2001-219,287, Jun. 2013.*

* cited by examiner

METHOD AND APPARATUS FOR THE QUALITY INSPECTION OF LASER WELDING

CROSS-REFERENCE TO RELATED APPLICATION

This application claims the benefit under 35 U.S.C. §119(a) of Korean Patent Application No. 10-2010-0114723 filed in the Korean Intellectual Property Office on Nov. 18, 2010, the entire contents of which are incorporated herein by reference.

BACKGROUND OF THE INVENTION (a) Field of the Invention

The present invention relates to a method and apparatus for inspecting the quality of laser welding, and more particularly, a method and apparatus for inspecting the quality of laser welding by monitoring the size of a metal molten pool (i.e., weld metal) during a laser welding process.

(b) Background Art

In general, laser welding is a joining technique used to join metals or non-metals in order to melt and fuse the metals or non-metals together using a laser beam emitted from a laser as a heat source as shown in FIG. 1.

When a laser beam is irradiated onto base metals, a keyhole is created by the laser beam and a weld metal surrounding the keyhole is molten. Then, the resultantly formed keyhole and the molten metal pool are moved continuously in a particular direction, i.e., a welding progress direction of the base metal in order to perform the welding process (e.g., longitudinal).

The laser welding used as a vehicle body assembly technique is a method that processes materials using a densely focused laser beam. Such a laser welding has an advantage in that thermal deformation is small, productivity is high, and the materials to be processed are less restricted, but requires a relatively precise weld matching operation as compared to spot welding.

For such a laser welding, a defect of the welding quality occurs as follows.

In case of galvanized steel plates, a zinc vapor discharge gap in the order of 0.1-0.2 mm is required to inhibit the cracking of the weld bead.

If a gap between welding base metals is less than approximately 0.1 mm, there occurs a welding failure such as the cracking of the weld bead as shown in FIG. 1(a). On the other hand, if the gap between the welding base metals exceeds approximately 0.2 mm, there occurs a welding failure such as undercuts as shown in FIG. 1(b).

A conventional laser welding quality inspection method based on the monitoring of a laser processed light will be described hereinafter.

FIG. 2 is a schematic view illustrating a conventional laser welding quality inspection system based on the monitoring of a laser processed light, and FIG. 3 is a schematic view illustrating a wavelength band of a laser welding processed light (or light).

As shown in FIGS. 2 and 3, a welding processed light emitted from a welding part during a laser welding process is converted into an electrical signal, and a signal on which determination of good welding quality is based is set as a reference waveform. An upper limit value and a lower limit value are decided based on the reference waveform so that when a detected signal is beyond the region of the upper and lower limit waveforms, the welding part is determined to have a welding failure A laser welding processed light typically includes a near infrared ray (NIR), a near ultraviolet ray (NUVR), a laser reflected light, and the like. Generally, the laser reflected light occupies the majority of the laser welding processed light.

A conventional technology employs a method in which a laser processed light is converted into an electrical signal and the converted electrical signal is simply compared with a reference waveform, followed by analysis. However, since the laser reflected light occupies the majority of the laser welding processed light, a signal associated with the length of a defective weld, the width of a weld bead, or the like is small, which makes it impossible to correctly measure the quality of the laser welding. For this reason, such a signal is mainly used for monitoring a laser power. Besides, since a trend of the laser power monitoring signal is analyzed and set using a statistical method of collecting data for about two weeks, a professional technique that makes it very difficult for a general worker to set the signal is required. In addition, there is involved a problem in that a technician of an automobile maker mostly sets the signal personally, and hence a lot of time and cost is spent.

In other words, the laser welding processed light includes a near infrared ray (NIR), a near ultraviolet ray (NUVR), a laser reflected light, and the like. Generally, since the laser reflected light occupies the majority of the laser welding processed light, the laser welding quality cannot be correctly investigated by the conventional method in which an electrical signal of the sensed welding processed light is simply compared with a reference waveform, followed by analysis.

Thus, as shown in FIG. 4, primarily, it is required that a laser reflected light should be optically filtered and removed from a sensed laser welding processed light. The wavelength band of a laser processed light that has passed through a chromatic aberration filter is a range of the near ultraviolet ray (NUVR) and the near infrared ray (NIR), which is a plasma light generated from a laser welding molten pool.

In FIG. 5, there is shown an electrical signal of the sensed plasma light.

The electrical signal of the plasma light is divided into an AC component indicating an irregular white curve portion in a graph of FIG. 5 and a DC component pulsating instantaneously. In this case, the plasma is closely related with the state of a molten pool and the welding quality.

As a result of analysis of a photographed molten pool of a laser welding part using a high-speed camera capable of taking more than 500 frames-per-second (fps), it can be seen that a series of numerous processes are repeatedly performed in which the laser welding part absorbs a laser beam condensed thereto to cause a solid-state metal thereof to be melt, and an optic head is moved in a welding progress direction so that a rear portion positioned 1-3 mm away from a focus of the laser beam is rapidly coagulated to produce a weld bead.

The state of the molten pool of the laser welding part in the same base metal varies susceptibly depending on a gap between a base metal panel and a base metal panel, which it is desired to weld.

If this gap is large, the molten pool melt by the laser beam is mostly filled in the gap, and thus there occurs a welding failure such as an undercut in which an upper portion of a produced weld bead is sunken.

In addition, since the size of the upper portion of the molten pool becomes small, the strength and the instantaneous variation of a plasma light generated externally from the welding part are decreased.

On the other hand, if the gap is proper, since the amount of the molten metal pool filled in the gap is small, and thus the size of the upper portion of the molten poll becomes large. In addition, the strength and the instantaneous variation of a plasma light generated externally from the welding part are increased, and the waveform of the plasma light is also very stable.

As discussed above, in a multi-fold overlapping welding of a galvanized steel plate, if a gap between both panels is less than 0.1 mm, zinc vapor entrapped in the metal molten pool is discharged to the outside through the weld bead into plasma, and thus the strength and the instantaneous variation of a plasma light is further increased as compared to the case of a proper gap (good in welding quality), thereby making the waveform of the plasma light unstable.

Accordingly, methods are proposed in which an electrical signal of this plasma light is monitored to inspect the quality of the laser welding.

However, in the same laser welding part of a vehicle body, since a variation of the DC component of the plasma signal varies significantly depending on the state and the matching relation of the panel, it is difficult to correctly check the quality of the laser welding using the variation of the DC component of the plasma signal.

Thus, a technology has been recently proposed which performs the quality inspection of the laser welding by partially employing an AC component from which the DC component of the plasma signal is filtered. For example, such a technology is exemplified by Japanese Patent Nos. P2000-271768A and P2001-48756.

However, since the above-mentioned Japanese Patent documents employ a simple filtering method which removes only a DC component of less than a specific frequency, a welding processed light signal of other wavelength bands should be additionally sensed and should be subjected to a significantly complicated process to implement a laser welding quality inspection method due to a reduced discriminating power between an AC component of a welded part which is good in welding quality and a sensor electrical signal of a welded part in which a welding failure occurs.

For example, the above-mentioned Japanese Patent documents perform the inspection of the quality of the laser welding using a total of eight sensor signals including two sensor signals, a signal indicative of a laser reflected light, a signal indicative of a plasma light, a signal of a DC component, and a signal of an AC component.

In addition, collecting data of a welded zone where welding is good and a welded zone where welding is defective should occur through numerous tests.

Actually, innumerable combinations of the laser welding base metals exist in a vehicle body laser welding line. Thus, in case of using the above method, it is in fact impossible to secure the data with respect to the entire laser welding part of a vehicle body in terms of efficiency of welding time arrangement, which makes it impossible to apply to a vehicle body welding process.

The information disclosed in this Background of the Invention section is only for enhancement of understanding of the background of the invention and should not be taken as an acknowledgment or any form of suggestion that this information forms the prior art that is already known to a person skilled in that art.

SUMMARY OF THE INVENTION

The present invention is directed at solving the above-mentioned problems occurring in the prior art, and it is an object of the present invention to provide a method and apparatus for inspecting the quality of laser welding, in which a new type laser welding quality inspection system is implemented in which one sensor signal and one filtered electrical signal of the plasma light can be used to perform a correct welding quality inspection through the development of a filtering method of an electrical signal of the plasma light, thereby facilitating laser welding quality management and making possible its actual application to a vehicle body laser welding process.

In order to accomplish the above object, in one aspect, the present invention provides an apparatus for inspecting the quality of laser welding, comprising: a laser welding system configured to perform a laser welding process; a quality inspection sensor configured to sense a plasma light generated from a laser welding part and then output a plasma light sensing signal; and a quality inspection unit configured to receive the plasma light sensing signal outputted from the quality inspection sensor, convert the received plasma light sensing signal into an electrical signal, filter the converted electrical signal, and determining the quality of the laser welding based on an instantaneous variation of the plasma light as an AC component of the filtered electrical signal of the plasma light, wherein the quality inspection unit further comprises a frequency dividing and filtering/amplifying portion configured to divide the plasma light sensing signal outputted from the quality inspection sensor into a plurality of frequency bands, for example, five frequency bands including 0-50 Hz, 50-100 Hz, 100-500 Hz, 500 Hz-1 kHz, and more than 1 kHz, filter or amplify the frequency band divided signals individually, synthesize the filtered and amplified signals, and output a square of an input value of the synthesized signal through a multiplication amplifier so that the quality of the laser welding can be inspected using the instantaneous variation of the plasma light filtered in a multi-divided composite signal processing scheme.

In one embodiment, the frequency dividing and filtering/amplifying portion may include a frequency division unit for dividing a plasma light sensing signal transmitted from the quality inspection sensor into a plurality of frequency bands, a filtering/amplifying unit for filtering and amplifying the frequency band divided signals individually, a signal synthesis unit for synthesizing the filtered and amplified signals, and a multiplication amplifier for outputting a square of an input value of the synthesized signal.

In addition, in one embodiment, the frequency dividing and filtering/amplifying portion may include a frequency dividing and filtering/amplifying circuit that is composed of one high-pass filter, one low-pass filter connected in series with the high-pass filter, and an amplifier by each frequency band.

Moreover, in one embodiment, the laser welding quality inspection apparatus may further comprise a quality inspection control computer (e.g., PC) configured to enable transmission and reception of a signal to and from the quality inspection unit, and control the operation variables of a filtering and amplifying block divided into a plurality of frequency bands to be adjusted individually to adapt to the characteristics of an on-site laser welding part.

In another aspect, the present invention provides a method for inspecting the quality of laser welding comprising: a step of performing a laser welding process on a vehicle put to a vehicle body assembly line; and a step of sensing a plasma light generated from a laser welding part using a quality inspection sensor to output a plasma light sensing signal, converting the plasma light sensing signal into an electrical signal, filtering the converted electrical signal, and determining the quality of the laser welding based on an instantaneous variation of the plasma light as an AC component of the filtered electrical signal of the plasma light, wherein the step of determining the quality of the laser welding comprises a step of dividing the plasma light sensing signal into a plurality of frequency bands, for example, five frequency bands including 0-50 Hz, 50-100 Hz, 100-500 Hz, 500 Hz-1 kHz, and more than 1 kHz, filtering or amplifying the frequency band divided signals individually, again synthesizing the filtered and amplified signals, and outputting a square of an input value of the synthesized signal through a multiplication amplifier whereby whether the quality of the laser welding is acceptable (e.g., "good" or "bad") can be determined using the outputted instantaneous variation of the plasma light.

Preferably, in the step of determining the quality of the laser welding, the instantaneous variation of the plasma light may be divided into given sections and then an average of the instantaneous variations of the plasma light by each section may be compared with a determination reference value to determine the quality of the laser welding.

In addition, the laser welding quality inspection method may further comprise, if it is determined in the step of determining the quality of the laser welding that a welding failure occurs in the welding part, a step of transmitting a result of the determination to an inspection repair process line (e.g., that is positioned separately from the vehicle body assembly line) so that a repair work of the welding part can be performed.

Further, the laser welding quality inspection method may further comprise a laser power abnormality monitoring process of converting a laser welding processed light emitted from a welding part into an electrical signal, and comparing the converted electrical signal with the upper and lower limit values of a reference waveform that is set as a signal on which determination of acceptable (e.g., good) welding quality is based.

Other aspects of the invention are discussed herein.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
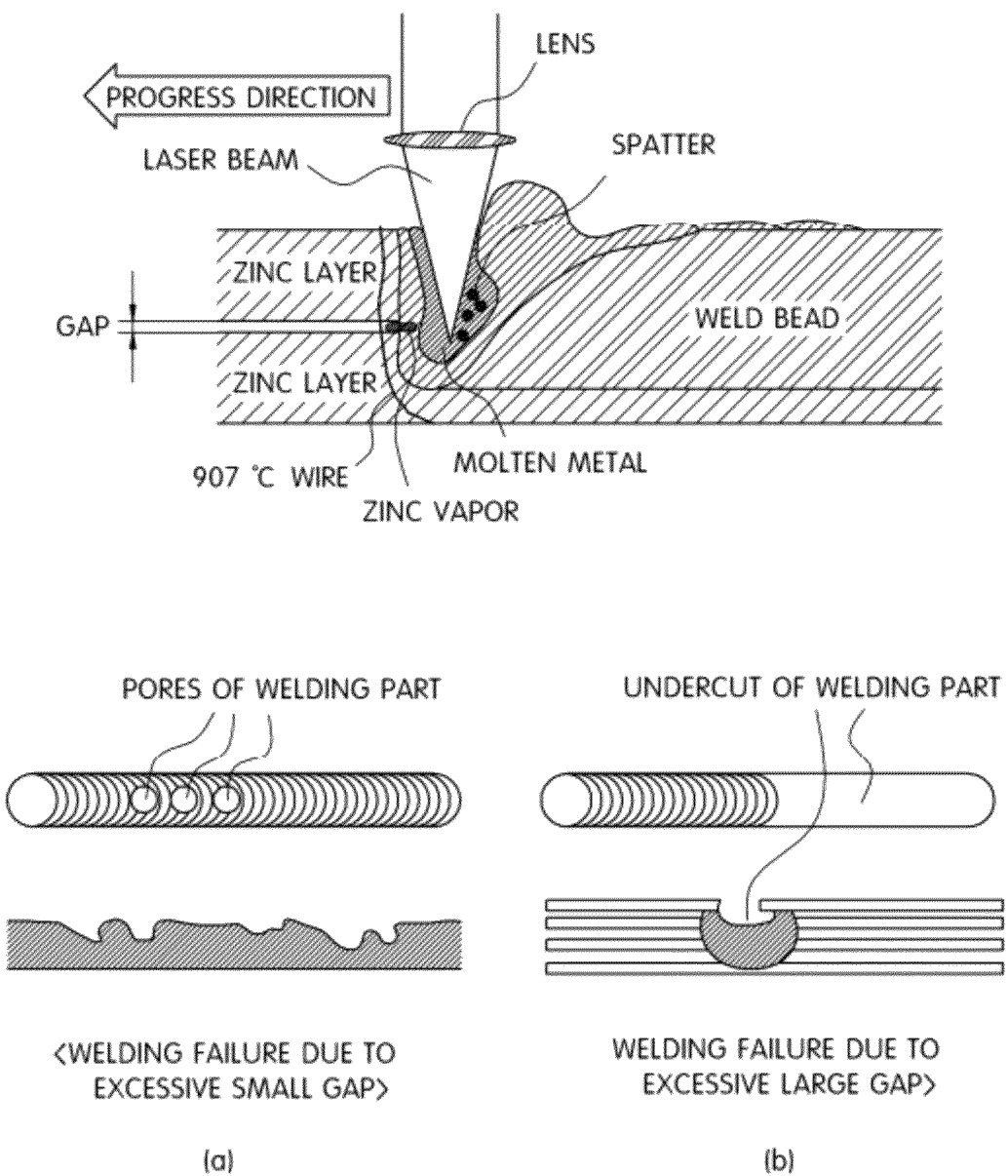
FIG. 1 is a schematic view illustrating a general laser welding method and welding failure states.
Figure 2:
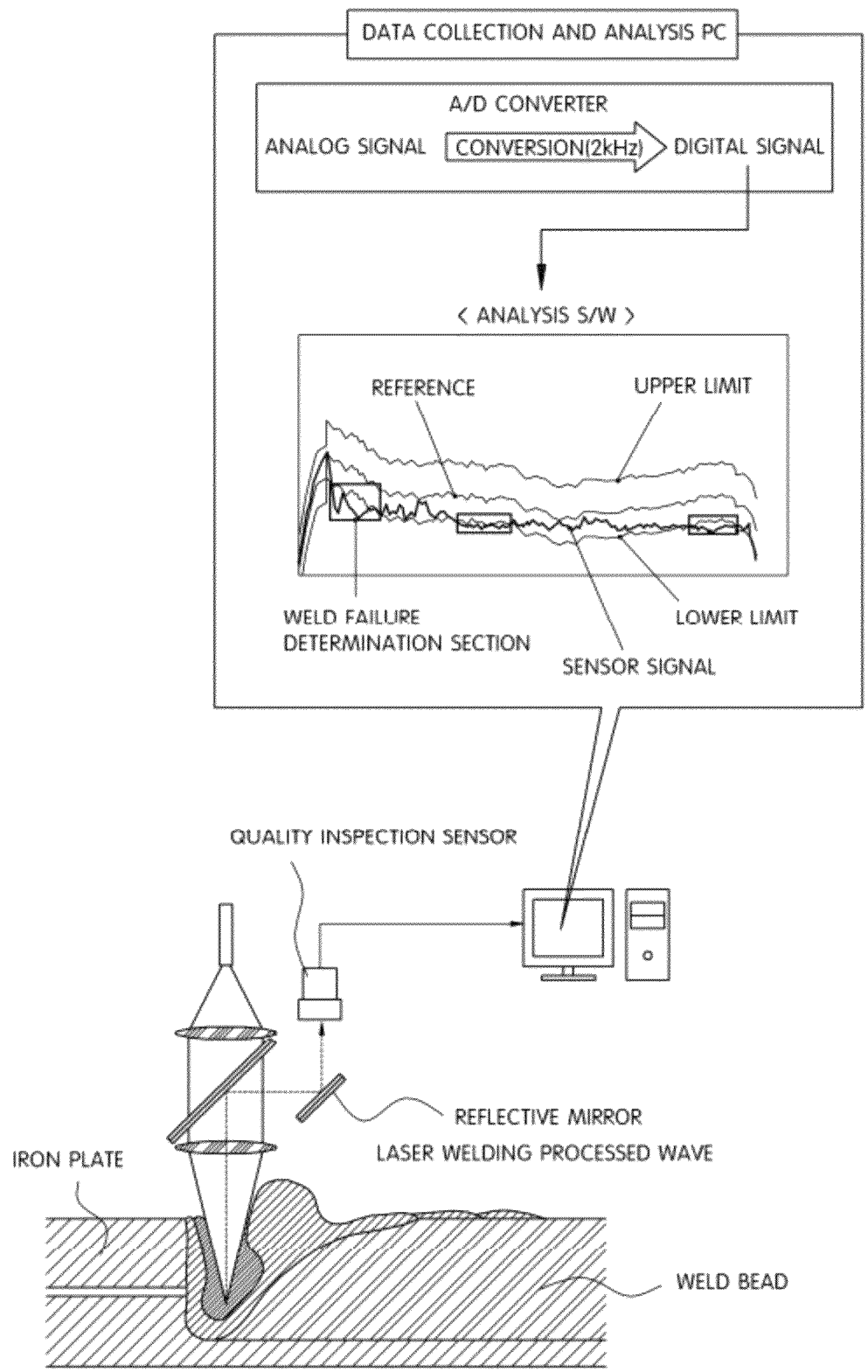
FIG. 2 is a schematic view illustrating a welding quality inspection method through the monitoring of a laser welding processed light.
Figure 3:
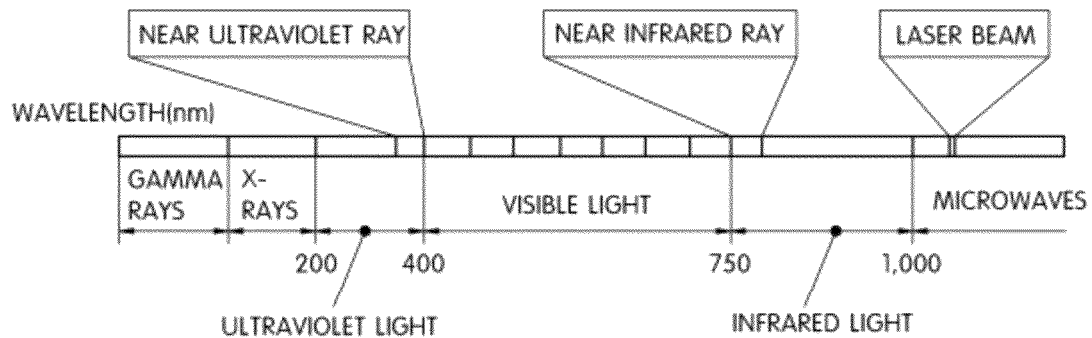
FIG. 3 is a schematic view illustrating a frequency band of a laser welding processed light associated with a laser welding process.
Figure 4:
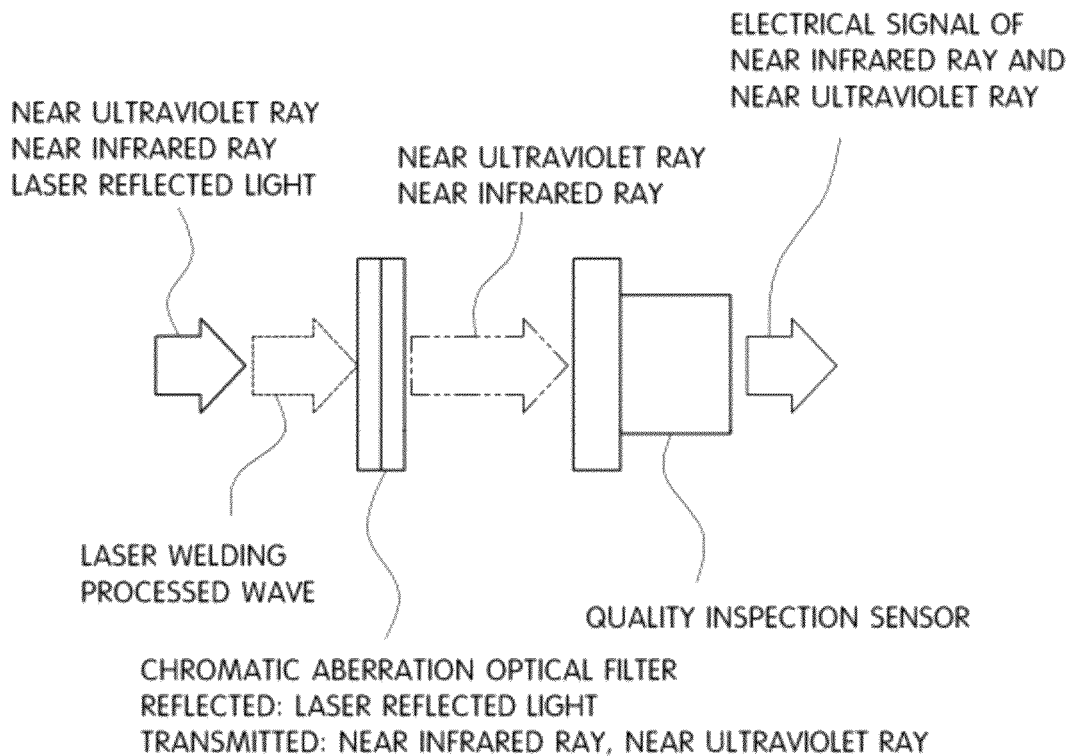
FIG. 4 is a schematic view illustrating a method for optically filtering a laser reflected light.
Figure 5:
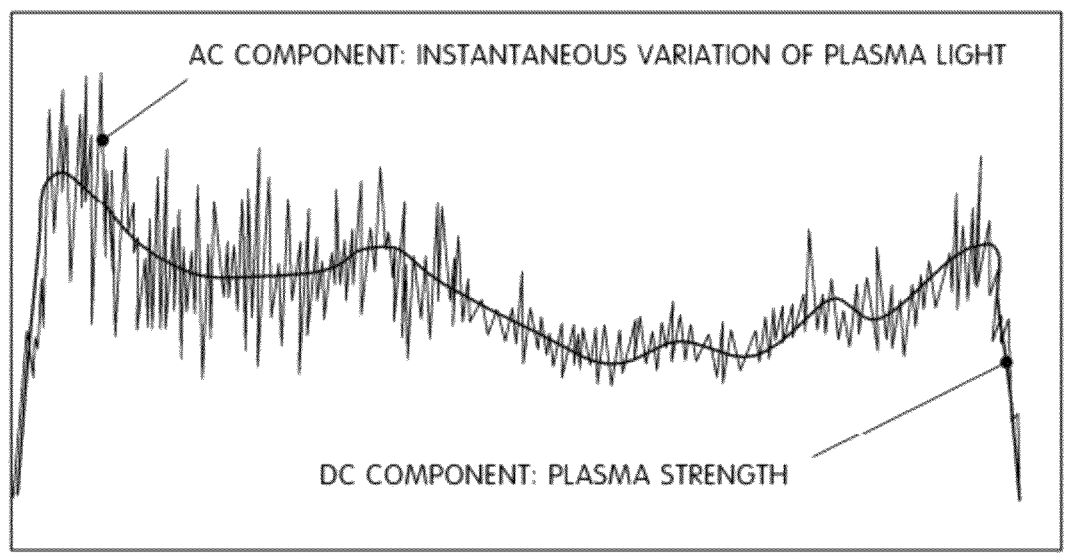
FIG. 5 is a graph showing an electrical signal of a plasma light generated from a laser welding part.

Reference numerals set forth in the Drawings include reference to the following elements as further discussed below:
10: laser welding system
11: quality inspection unit
12: quality inspection sensor
13: frequency dividing and filtering portion/circuit
14: quality inspection control PC
15: QC display PC
16: remote monitoring PC

DETAILED DESCRIPTION

Reference will now be made in detail to one or more embodiments of the present invention, examples of which are illustrated in the drawings attached hereinafter, wherein like reference numerals refer to like elements throughout. The embodiments are described below so as to explain the present invention by referring to the figures.

Also, it is understood that the term "vehicle" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. The present systems will be particularly useful with a wide variety of motor vehicles.

The embodiments according to the present invention will be described hereinafter in detail with reference to the accompanying drawings.

Figure 6:
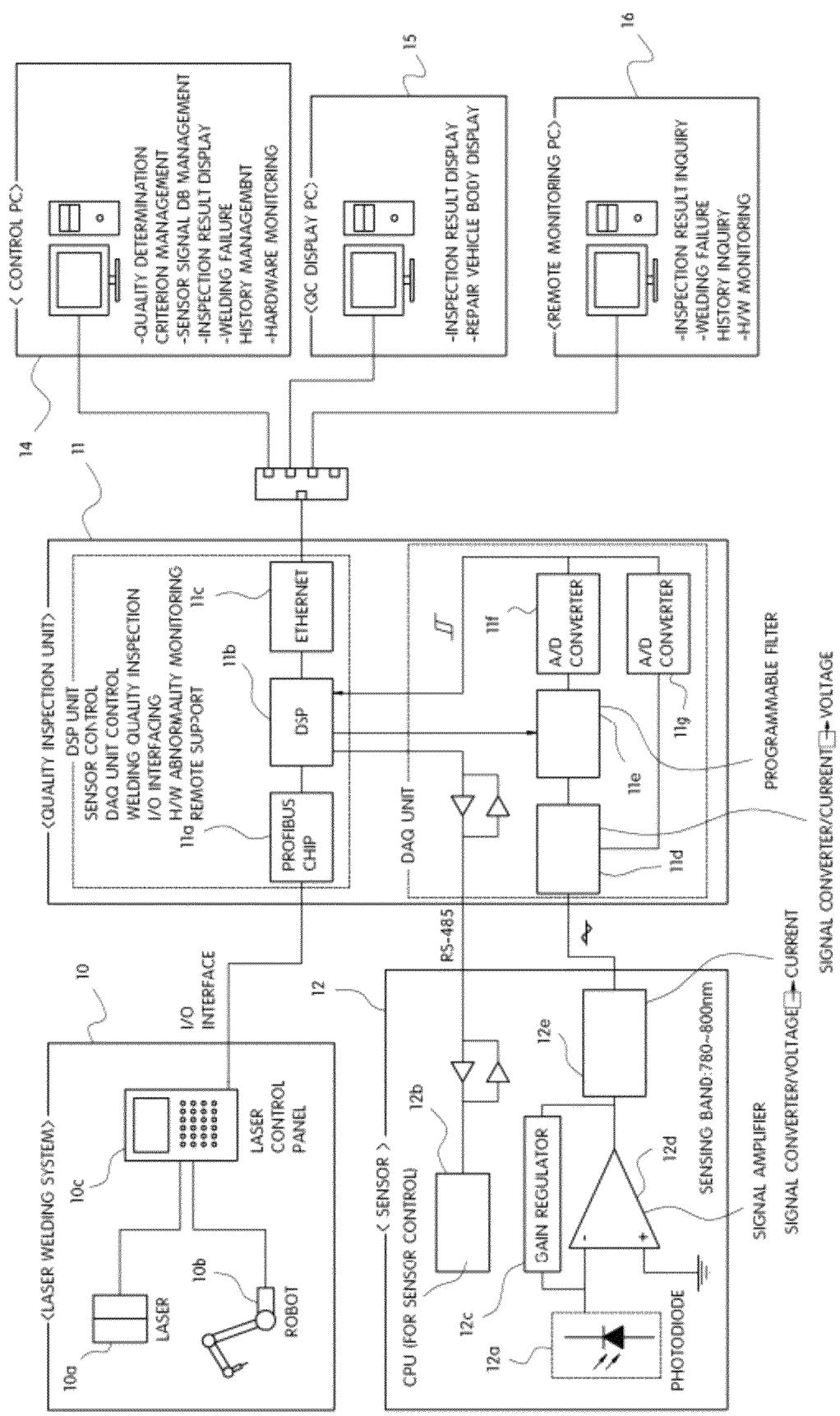
FIG. 6 is a block diagram illustrating the construction of a laser welding quality inspection apparatus according to an embodiment of the present invention.

In particular, FIG. 6 is a block diagram illustrating the construction of a laser welding quality inspection apparatus according to an embodiment of the present invention.

As shown in FIG. 6, the laser welding quality inspection apparatus is one that can correctly inspect the quality of laser welding using one sensor signal and one filtered electrical signal of the plasma light, i.e., a substantially instantaneous variation of the plasma light in a method for filtering an electrical signal of the plasma light generated from a laser welding part.

To this end, the laser welding quality inspection apparatus includes: a general laser welding system 10 including a laser 10a, a robot 10b, and a laser control panel 10c; a quality inspection sensor 12 including an infrared sensor 12a, a CPU for sensor control 12b, a gain regulator 12c, a signal amplifier 12d, and a signal converter 12e for converting voltage into current; and a quality inspection unit 11 including a DSP unit and a DAQ unit and configured to substantially determine the quality of laser welding, as described herein.

The quality inspection unit 11 and the laser welding system 10 can communicate with each other through an I/O interface, and the quality inspection sensor 12 and the quality inspection unit 11 can communicate with each other through an interface such as an RS-485 interface.

In addition, the laser welding quality inspection apparatus of the present invention may further include a quality inspection control PC 14 for controlling the quality inspection unit 11, a quality control (QC) display PC 15 for displaying a welding result in a quality inspection and management process, and a remote monitoring PC 16 for monitoring the quality of laser welding at a remote place.

The quality inspection control PC 14, the QC display PC 15 and the remote monitoring PC 16 may be interconnected via an Ethernet hub, which is a local area network (LAN) to enable the devices to communicate with each other.

The quality inspection sensor 12 includes a photodiode 12a for sensing a laser welding processed light, an amplifier 12d for amplifying a signal, and a signal converter 12e for transmitting an analog signal to a remote place. In addition, the quality inspection sensor 12 allows a signal amplification degree to be adjusted through the communication between the quality inspection unit and the quality inspection control PC 14.

In one embodiment, the sensing band of the quality inspection sensor 12 can be set to a range between 780 nm and 800 nm.

The quality inspection unit 11 includes a digital signal processor (DSP) unit and a data acquisition (DAQ) unit. The DSP unit performs a variety of functions including Input/Output (I/O) interfacing, sensor control, welding quality inspection, hardware abnormality monitoring, and remote support. The DSP unit may illustratively comprise an I/O interface chip such as a process field bus (PROFIBUS) chip 11a, a DSP 11b, and an Ethernet connection 11c. The DAQ unit includes a block 11d for converting a quality inspection signal transmitted from the quality inspection sensor from a current level to voltage level, a programmable filter block 11e for controlled by the DSP unit, and two A/D (analog to digital) conversion blocks 11f and 11g.

The quality inspection control PC 14 performs a variety of functions including sensor signal filtering condition management, quality determination criterion management, sensor signal database (DB) management, inspection result display, welding failure history management, statistical analysis of inspection result, and hardware monitoring.

In addition, the QC display PC 15 functions to display an inspection result and a repair part upon the occurrence of a welding failure. The remote monitoring PC 16 can perform an inspection result inquiry, a welding failure history inquiry, and a hardware monitoring.

Figure 7:
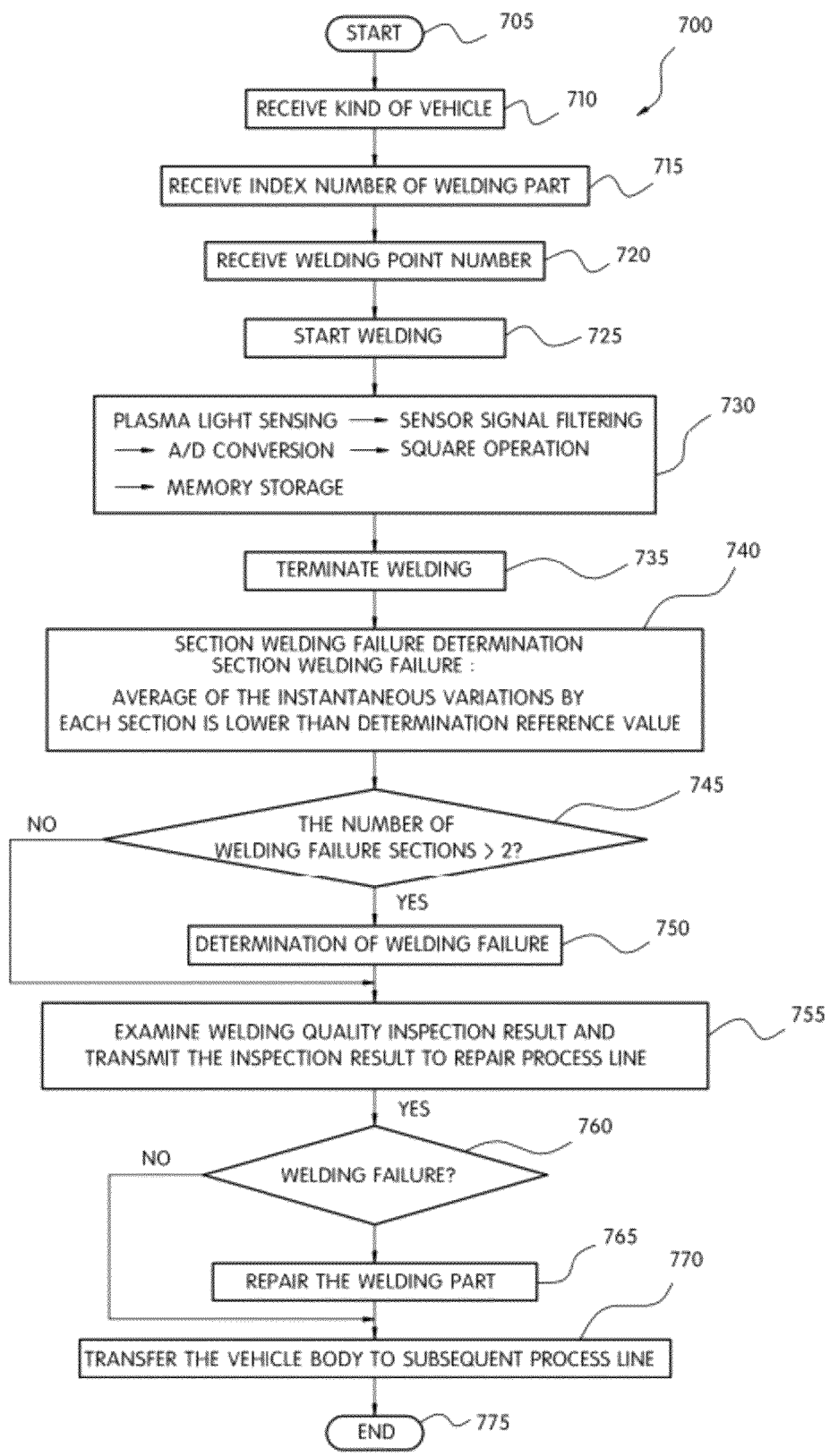
FIG. 7 is a flowchart illustrating a laser welding quality inspection method according to an embodiment of the present invention.

FIG. 7 is a flowchart illustrating a laser welding quality inspection method according to an embodiment of the present invention.

As shown in FIG. 7, the laser welding quality inspection method 700, which starts at step 705 and ends at step 775, includes performing a laser welding process on a vehicle in a vehicle body assembly line, sensing a plasma light generated from a laser welding part using a quality inspection sensor to output a plasma light sensing signal, converting the plasma light sensing signal into an electrical signal, filtering the converted electrical signal, and determining the quality of the laser welding based on an instantaneous variation of the plasma light as an AC component of the filtered electrical signal of the plasma light.

In particular, as shown in FIG. 7, performing the laser welding process includes a welding preparing step of receiving a kind of a vehicle put to a vehicle body assembly line (step 710), receiving an index number of a welding part (step 715) and at the same time receiving the number of a welding point (step 720), a step of starting a welding process (step 725), a step of acquiring an instantaneous variation of a certain filtered electrical signal of a plasma light from a laser welding processed light generated during the laser welding (step 730, e.g., as shown, plasma light sensing, sensor signal filtering, A/D conversion, square operation, and memory storage), and a step of terminating the welding process (step 735).

Determining the quality of the laser welding is performed based on the instantaneous variation of the certain filtered electrical signal of a plasma light acquired in the above step 730. For example, a step is performed in which a plasma light sensing signal is divided into five frequency bands including 0-50 Hz, 50-100 Hz, 100-500 Hz, 500 Hz-1 kHz, and more than 1 kHz, and the frequency band divided signals are filtered or amplified individually. Thereafter, a step is performed in which the filtered and amplified signals are synthesized again, and a square of an input value of the synthesized signal is outputted through a multiplication amplifier. Then, a step of determining the quality of the laser welding is performed based on the outputted instantaneous variation of the plasma light.

At this time, in the step of determining the quality of the laser welding, the instantaneous variation of the plasma light used to determine a section welding failure (step 740) is divided into given sections, i.e., five sections, and then an average of the instantaneous variations of the plasma light by each section is compared with a determination reference value to determine the quality of the laser welding by section.

In other words, if the numbers of welding failure sections (i.e., sections where an average of the instantaneous variations of the plasma light by each section is lower than a determination reference value) exceeds two among the five sections (step 745), namely, if the number of sections where the instantaneous variation of the plasma light is small exceeds two, it is determined that a welding failure occurs (step 750).

In addition, a result of the determination is transmitted to an inspection repair process line (step 755). If it is determined that the welding failure occurs in the laser welding part (step 760), repair work of the welding part can be performed (step 765), e.g., at a separately located vehicle body assembly line (repair process line), and then the vehicle body is sent to a subsequent process line (step 770).

Figure 8:
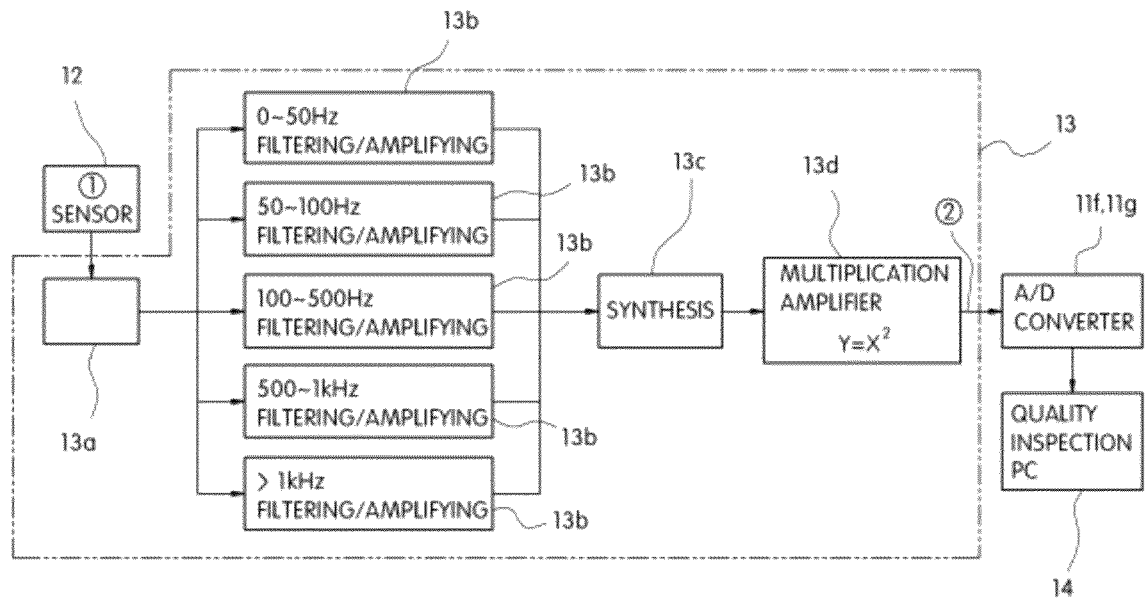
FIG. 8 is a block diagram and graph illustrating a frequency dividing and filtering/amplifying portion (e.g., circuit) and a multi-divided composite signal processing scheme in a laser welding quality inspection method according to an embodiment of the present invention.
Figure 8:
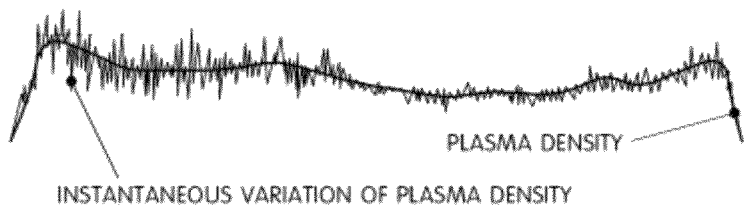
Figure 8:
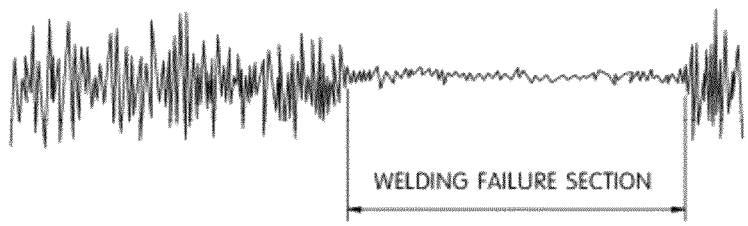

FIG. 8 is a block diagram and graph illustrating a frequency dividing and filtering/amplifying portion/circuit and a multi-divided composite signal processing scheme in a laser welding quality inspection method according to an embodiment of the present invention.

In FIG. 8, there is shown the construction of a frequency dividing and filtering/amplifying circuit 13 included in the DSP unit of the quality inspection unit 11 for processing a multi-divided composite signal.

The frequency dividing and filtering/amplifying circuit 13 functions to amplify a frequency band closely related with the quality of the laser welding and remove a frequency band in which welding quality determination error occurs.

To this end, the frequency dividing and filtering/amplifying circuit 13 may include a frequency division unit 13a for dividing a plasma light sensing signal transmitted from the quality inspection sensor 12 into a plurality of frequency bands, a filtering/amplifying unit 13b for filtering and amplifying the frequency band divided signals individually, a signal synthesis unit 13c for synthesizing the filtered and amplified signals, and a multiplication amplifier 13d for outputting a square of an input value of the synthesized signal.

In FIG. 8, an upper graph shows a signal (1) sensed by one photodiode (sensor 12), i.e., a signal before being subject to the filtering, and a lower graph shows a signal (2) after being subject to the filtering under a multi-dividing condition where a signal that is multi-divided into five frequency bands (after 13d).

More specifically, in the present invention, a sensor signal is divided into five frequency bands, the frequency band divided signals are filtered or amplified individually, the filtered or amplified signals are again synthesized, and a square of an input value of the synthesized signal is outputted through the multiplication amplifier in order to take out an instantaneous variation of the plasma light having a discriminating power.

The five sensor signal frequency bands are set in such a fashion that section 1 ranges from 0 Hz to 50 Hz, section 2 ranges from 50 Hz to 100 Hz, section 3 ranges from 100 Hz to 500 Hz, section 4 ranges from 500 Hz to 1 kHz, and section 5 ranges more than 1 kHz.

The respective sections were selected through numerous experiments according to the thickness and the number of folds of the base metal. Generally, as the thickness and the number of folds of the base metal increases, the frequency band affecting the quality of welding decreases.

Since numerous combinations of base metals of laser welding parts exist in a vehicle body of an automobile, the frequency bands of an electrical signal of the plasma light at the laser welding parts, which are closely related with the laser welding quality, differ from each other.

Thus, if one specific filtering condition is selected through experiments and is applied to a laser welding quality inspection method, a laser welding quality inspection error is apt to occur.

Therefore, in the present invention, the quality inspection control PC 14 allows the operation variables of the filtering and amplifying block divided into five frequency bands to be controlled individually to adapt to the characteristics of an on-site laser welding part.

The operation variables of the respective divided filtering/amplifying units can be controlled by the quality inspection control PC as shown in FIG. 6. These variable values are transmitted to the quality inspection unit and are controlled by the programmable filter block.

The multiplication amplifier is intended to further improve the discriminating power of the sensor signal synthesized after being subjected to the five divided filtering/amplifying phases.

Figure 9:
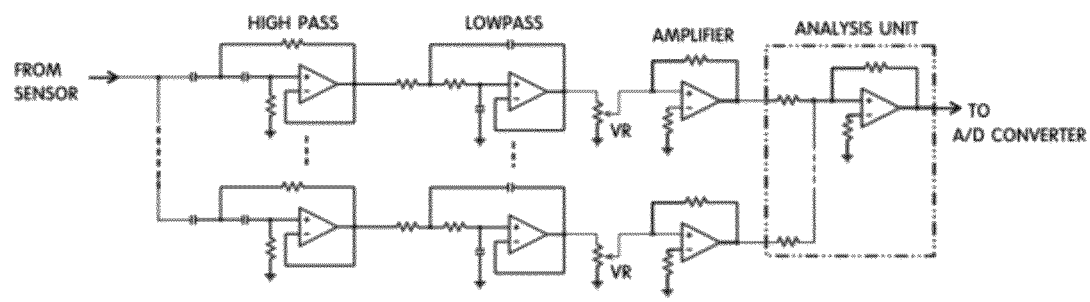
FIG. 9 is a circuit diagram illustrating a frequency dividing and filtering/amplifying circuit used in a laser welding quality inspection method according to an embodiment of the present invention.

As shown in FIG. 9, the frequency dividing and filtering/amplifying circuit used in the present invention may be composed of one high-pass filter, one low-pass filter connected in series with the high-pass filter, and an amplifier by each frequency band.

A gain of the amplifier is adjusted by each electronic volume VR, and is controlled by the DSP unit.

The five frequency band-divided signals are synthesized at a ratio of 1:1 by an operational (OP) amplifier whose input impedance is high.

The multiplication amplifier used in the present invention performs a square operation on a digital data converted by an amplifier implemented with software and inputted to the DSP unit, and stores the digital data in a storage device.

FIGS. 10a to 10f illustrate a system and algorithm of a laser welding quality inspection method according to an embodiment of the present invention.

Figure 10A:
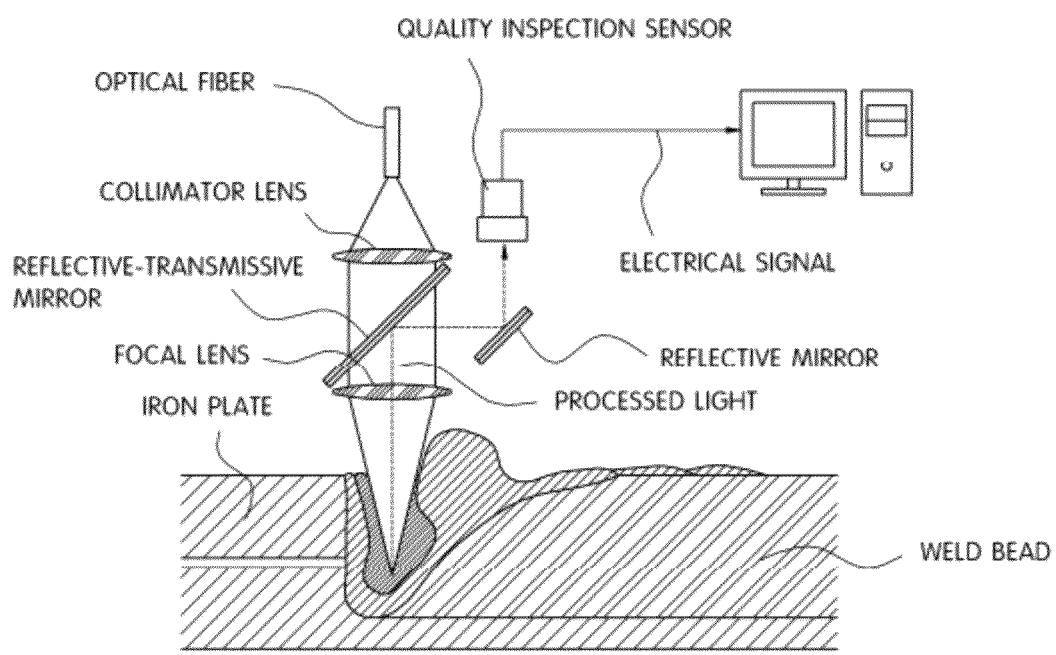
FIGS. 10a to 10f illustrate a system and algorithm of a laser welding quality inspection method according to an embodiment of the present invention.

Referring to FIG. 10a, a laser welding quality inspection system is shown for reference, while the algorithm will be described hereinafter with reference to FIGS. 10b to 10f.

First, when a two metals are prepared for welding (e.g., iron plates, such as for when vehicle body is put to an assembly factory), the laser welding system 10 performs a welding on the materials (e.g., vehicle body), as shown in FIG. 10a.

Figure 10B:
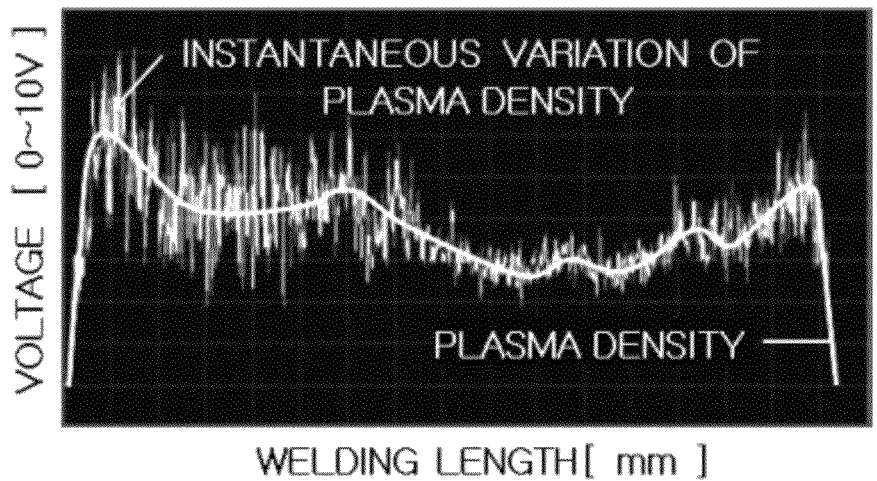

Next, as shown in FIG. 10b, a welding processed light is sensed during the welding. In this case, light (laser welding plasma density) emitted from a laser welding part is sensed.

At this time, the wavelength band of the light is in a band range of a near infrared ray (NIR), and a laser reflected light, and the quality inspection unit 11 converts the sensed welding processed light into an electrical signal.

Figure 10C:
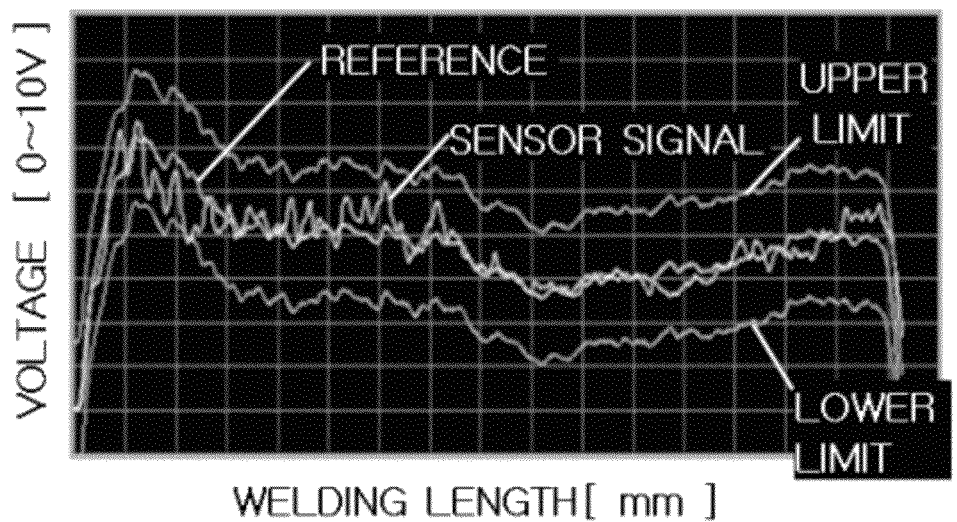

In the present invention, prior to taking out an instantaneous variation of the plasma density, a laser power abnormality is detected, as shown in FIG. 10c. At this time, an obtained signal can be used as a reference for determining a laser welding failure.

For example, a laser power abnormality monitoring process can be performed in which a laser welding processed light emitted from a welding part is converted into an electrical signal, and the converted electrical signal is compared with the upper and lower limit values of a reference waveform that is set as a signal on which determination of good welding quality is based.

Subsequently, the instantaneous variation of the plasma density is taken out. At this time, the converted electrical signal is filtered to remove a low frequency band. In this case, the frequency band of the signal used ranges from about 60 to 1,000 Hz.

Figure 10D:
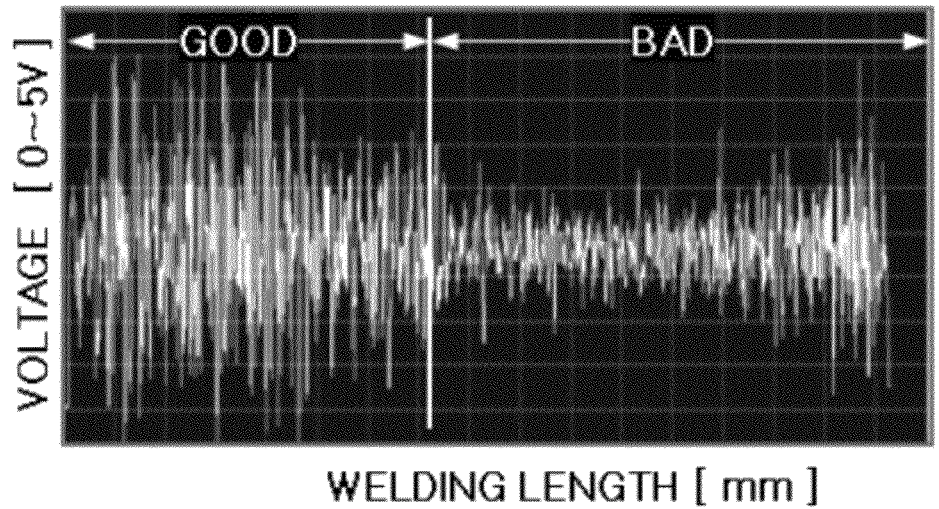

As can be seen from the graph in FIG. 10d, when the signal amplitude is small, it indicates a welding failure whereas when the signal amplitude is large, it indicates that the welding quality is good.

Figure 10E:
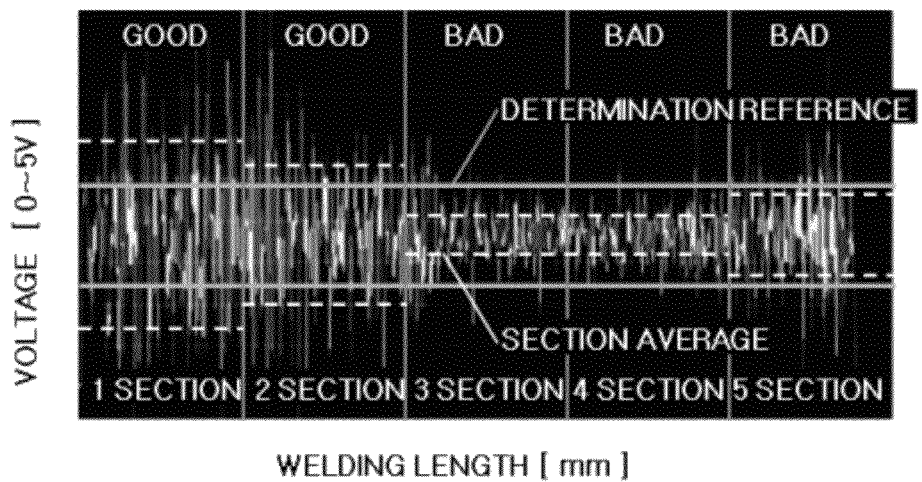

In particular, as shown in FIG. 10e, the welding quality by welding point is determined. The instantaneous variation of the plasma density taken out after being filtered in a multi-divided composite signal processing scheme is divided into given sections, e.g., five sections, and then an average of the instantaneous variations of the plasma light by each section is compared with a determination reference value to determine the quality of the laser welding by section.

In this case, a reference for the determination is decided by a worker. When a welding failure occurs, the signal is small. A value on which distinction between good welding quality and poor welding quality is based is set as the reference for the determination. If a signal falls within the range of the reference value, it is determined that there is a welding failure.

The decision on the welding quality may be made as follows. When a laser power abnormality occurs or when the number of sections where an average of the instantaneous variations of the plasma density by each section is lower than a determination reference value exceeds two as a result of comparison between an average of the instantaneous variations of the plasma light by each section and a determination reference value, it is determined that there is a welding failure.

In this case, two sections used as a reference for determining the welding failure can be arbitrarily set by a worker within a range that does not affect the welding quality and strength. Since the laser welding is higher in welding strength and better in welding quality than a spot welding, although an average of the instantaneous variations of the plasma density is small in about two sections of the entire welding length, this does not influence the quality of the entire welding part. Thus, about two sections can be typically set a reference for determining the welding failure.

However, one section, three sections, or the like may be set as a reference for determining the welding failure, if necessary.

Figure 10F:
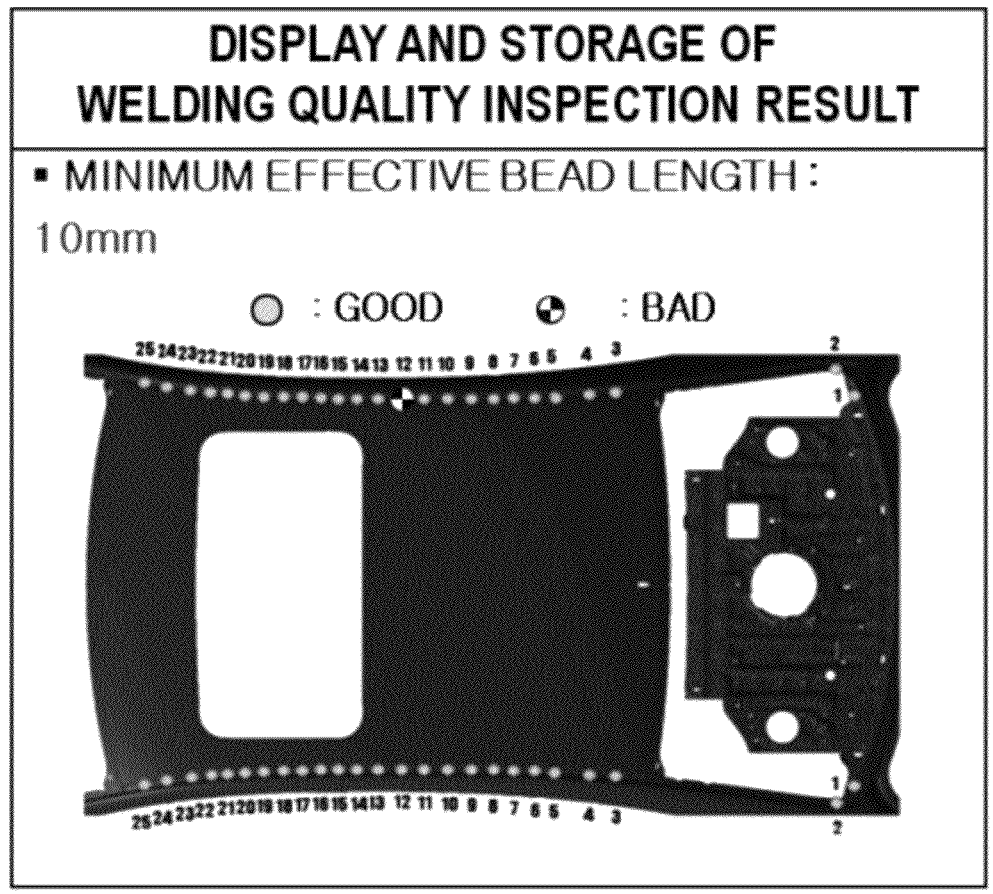

Next, a result of the welding quality inspection is displayed and stored, as shown in FIG. 10f. Whether the welding quality is good or bad for the entire welding length of a product can be displayed as shown in FIG. 10.

FIGS. 11a to 11d are graphs and photographs showing a comparison between the prior art and the present invention in terms of the state by welding quality type.

Referring to FIGS. 11a to 11d, a use example of a conventional simple filtering method of removing only a DC component of less than a specific frequency and a use example of a filtering method based on a multi-divided composite signal processing scheme according to the present invention are compared with each other.

Figure 11A:
FIGS. 11a to 11d are graphs and photographs showing a comparison between the prior art and the present invention in terms of the state by welding quality type.
Figure 11B:
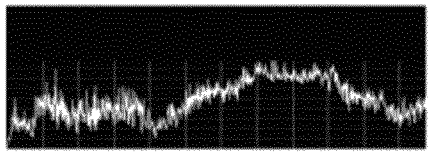
Figure 11C:
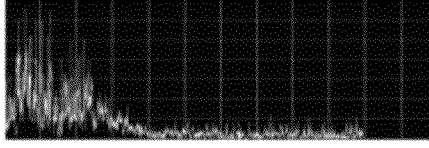
Figure 11D:
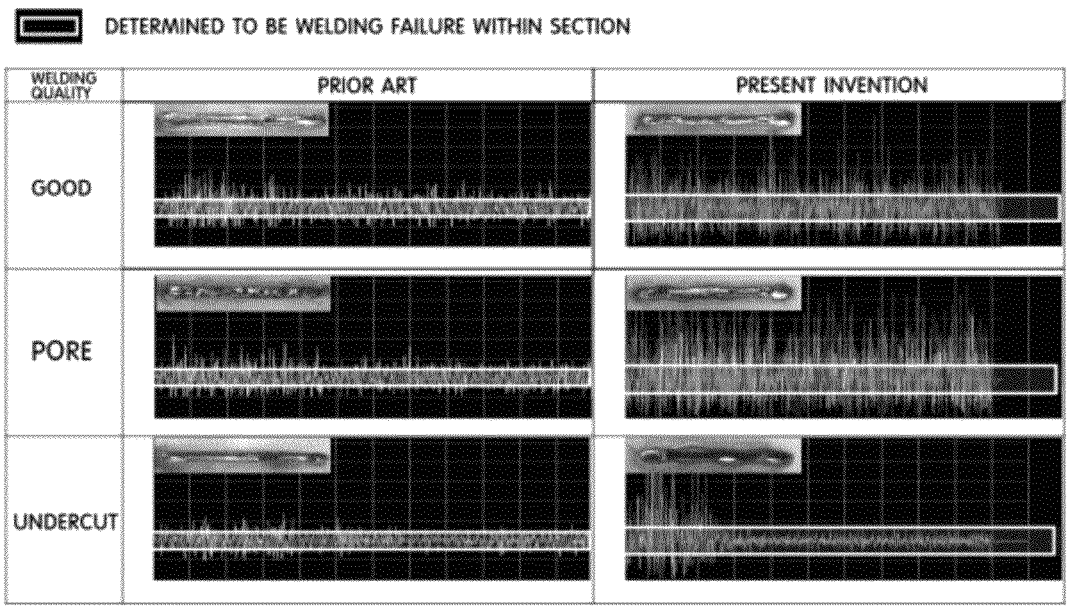

Specifically, FIG. 11a shows a comparison between the prior art and the present invention when the welding quality is in a "good" condition. FIG. 11b shows a comparison between the prior art and the present invention when the welding quality indicates an undercut condition. FIG. 11c shows a comparison between the prior art and the present invention when the welding quality indicates a poring condition. FIG. 11d shows a comparison between all of the instantaneous variation of plasma graphs for the conditions in FIGS. 11a to 11c.

In case of the convention filtering method, a difference between the sensing signal and the instantaneous variation of the plasma light is not distinct. On the contrary, in case of the inventive filtering method, a difference between the sensing signal and the instantaneous variation of the plasma light is distinct, thus exhibiting a signal discriminating power. Therefore, the present invention is advantageous in determining the acceptability of the welding quality, e.g., whether the welding quality is good/acceptable or bad (e.g., undercut, pored, etc.), as well as can ensure the correctness of the determination of the welding quality.

As described above, the method and apparatus for inspecting the quality of laser welding according to the present invention provides at least the following effects.

First, the quality inspection of the laser welding is performed by a new method of filtering the electrical signal of the plasma light using a combination of the laser welding system, the quality inspection sensor, the quality inspection unit, the quality inspection control PC, and the like, so that the welding quality inspection can be carried out correctly, and the inventive filtering method can be applied to an actual laser welding process.

Second, the maintenance and management of the laser welding quality is facilitated and the manufacturing cost can be saved.

The invention has been described in detain with reference to preferred embodiments thereof. However, it will be appreciated by those skilled in the art that changes and modifications may be made in these embodiments without departing from the principles and spirit of the invention, the scope of which is defined in the appended claims and their equivalents. For example, while the embodiments have generally been described with relation to vehicles (e.g., assembly lines), the invention is not so limited, and may be used with any suitable laser welding process. Further, the invention may be embodied as a tangible, non-transitory computer-readable media comprising software, in which the software when executed by a processor is operable to perform one or more aspects of the techniques described above. Therefore, what those skilled in the art to which the present invention pertains easily derive from the detailed description and the embodiment of the present invention should be construed as falling within the scope of the present invention.

What is claimed is:

1. A method, comprising:
    sensing a plasma light generated from a laser welding process as a plasma light sensing signal;
    determining an instantaneous variation of the plasma light by:
        i) dividing the plasma light sensing signal into a plurality of frequency bands by a frequency division unit,
        ii) filtering and amplifying one or more of the frequency band divided signals individually by a filtering/amplifying unit,
        iii) synthesizing the filtered and amplified signals by a signal synthesis unit, and
        iv) outputting a square of an input value of the synthesized signal through a multiplication amplifier as the instantaneous variation of the plasma light; and
    determining quality of the laser welding process based on the instantaneous variation of the plasma light,
    wherein the step of determining the quality of the laser welding process is performed by a frequency dividing and filtering/amplifying circuit that is composed of one high-pass filter, one low-pass filter connected in series with the high-pass filter, and an amplifier by each frequency band.

2. A tangible, non-transitory computer-readable media comprising software, the software when executed by a processor operable to:
    sense a plasma light generated from a laser welding process as a plasma light sensing signal;
    determine an instantaneous variation of the plasma light by:
        v) dividing the plasma light sensing signal into a plurality of frequency bands by a frequency division unit,
        vi) filtering and amplifying one or more of the frequency band divided signals individually by a filtering/amplifying unit,
        vii) synthesizing the filtered and amplified signals by a signal synthesis unit, and
        viii) outputting a square of an input value of the synthesized signal through a multiplication amplifier as the instantaneous variation of the plasma light; and
    determine quality of the laser welding process based on the instantaneous variation of the plasma light,
    wherein the step of determining the quality of the laser welding process is performed by a frequency dividing and filtering/amplifying circuit that is composed of one high-pass filter, one low-pass filter connected in series with the high-pass filter, and an amplifier by each frequency band.

3. An apparatus for inspecting the quality of laser welding, comprising:
    a laser welding system configured to perform a laser welding process on a laser welding part;
    a quality inspection sensor configured to sense a plasma light generated from the laser welding part and then output a plasma light sensing signal; and
    a quality inspection unit configured to receive the plasma light sensing signal outputted from the quality inspection sensor, convert the received plasma light sensing signal into an electrical signal, filter the converted electrical signal, and determine the quality of the laser welding based on an instantaneous variation of the plasma light as an AC component of the filtered electrical signal of the plasma light,
    wherein the quality inspection unit further comprises a frequency dividing and filtering/amplifying portion including: i) a frequency division unit configured to divide the plasma light sensing signal outputted from the quality inspection sensor into a plurality of frequency bands, ii) a filtering/amplifying unit configured to filter and amplify one or more of the frequency band divided signals individually, iii) a signal synthesis unit configured to synthesize the filtered and amplified signals, and iv) a multiplication amplifier configured to output a square of an input value of the synthesized signal, and wherein the frequency dividing and filtering/amplifying portion comprises a frequency dividing and filtering/amplifying circuit that is composed of one high-pass filter, one low-pass filter connected in series with the high-pass filter, and an amplifier by each frequency band.

4. The apparatus according to claim 3, wherein the plurality of frequency bands into which the frequency dividing and filtering/amplifying portion divides the plasma light sensing signal outputted from the quality inspection sensor comprises five frequency bands including 0-50 Hz, 50-100 Hz, 100-500 Hz, 500 Hz-1 kHz, and more than 1 kHz.

5. The apparatus according to claim 3, further comprising a quality inspection control computer configured to enable transmission and reception of a signal to and from the quality inspection unit, and control the operation variables of a filtering and amplifying block divided into a plurality of frequency bands to be adjusted individually to adapt to characteristics of the laser welding part.

6. The apparatus according to claim 3, wherein the quality of the laser welding is inspected using the instantaneous variation of the plasma light filtered in a multi-divided composite signal processing scheme.

7. The apparatus according to claim 3, wherein the frequency dividing and filtering/amplifying portion comprises a frequency dividing and filtering/amplifying circuit that is composed of one high-pass filter, one low-pass filter connected in series with the high-pass filter, and an amplifier by each frequency band.

8. The apparatus according to claim 3, wherein the plurality of frequency bands into which the frequency dividing and filtering/amplifying portion divides the plasma light sensing signal outputted from the quality inspection sensor comprises five frequency bands including 0-50 Hz, 50-100 Hz, 100-500 Hz, 500 Hz-1 kHz, and more than 1 kHz.

9. The apparatus according to claim 3, further comprising a quality inspection control computer configured to enable transmission and reception of a signal to and from the quality inspection unit, and control the operation variables of a filtering and amplifying block divided into a plurality of frequency bands to be adjusted individually to adapt to characteristics of the laser welding part.

10. A method for inspecting quality of laser welding comprising:

performing a laser welding process on a laser welding part;

sensing a plasma light generated from the laser welding part using a quality inspection sensor to output a plasma light sensing signal;

converting the plasma light sensing signal into an electrical signal;

filtering the converted electrical signal; and determining a quality of the laser welding based on an instantaneous variation of the plasma light as an AC component of the filtered electrical signal of the plasma light, wherein the step of determining the quality of the laser welding comprises i) dividing the plasma light sensing signal into a plurality of frequency bands by a frequency division unit, ii) filtering and amplifying one or more of the frequency band divided signals individually by a filtering/amplifying unit, iii) synthesizing the filtered and amplified signals by a signal synthesis unit, and iv) outputting a square of an input value of the synthesized signal through a multiplication amplifier, whereby whether the quality of the laser welding is acceptable is determined using the outputted instantaneous variation of the plasma light, and wherein the step of determining the quality of the laser welding is performed by a frequency dividing and filtering/amplifying circuit that is composed of one high-pass filter, one low-pass filter connected in series with the high-pass filter, and an amplifier by each frequency band.

11. The method according to claim 10, wherein dividing the plasma light sensing signal into the plurality of frequency bands comprises dividing the plasma light sensing signal into five frequency bands including 0-50 Hz, 50-100 Hz, 100-500 Hz, 500 Hz-1 kHz, and more than 1 kHz.

12. The method according to claim 10, further comprising, in response to determining that the quality of the laser welding indicates that a welding failure occurred in the welding part, transmitting a result of the determination to an inspection repair process line.

13. The method according to claim 10, further comprising monitoring a laser power abnormality by comparing the converted electrical signal with upper and lower limit values of a reference waveform that is set as a signal on which determination of acceptable welding quality is based.

14. The method according to claim 10, wherein the laser welding part is a vehicle put to a vehicle body assembly line.

* * * * *